Sept. 15, 1936. C. E. MORLEY 2,054,706
VEHICLE TANK CONSTRUCTION
Filed Feb. 15, 1934

INVENTOR.
CHARLES E. MORLEY.
BY
ATTORNEY.

Patented Sept. 15, 1936

2,054,706

UNITED STATES PATENT OFFICE 2,054,706

VEHICLE TANK CONSTRUCTION

Charles E. Morley, Detroit, Mich.

Application February 15, 1934, Serial No. 711,294

2 Claims. (Cl. 280—5)

This invention relates to vehicle tank construction, the object being to provide a wheeled tank structure in which the tank body itself provides the sustaining and connecting element for the running gear.

It has heretofore commonly been the practice to provide tanks such as oil tanks or tanks for other liquid often as trailer vehicles transported by means of a tractor, but in such former structures, whether trailer or tractor, there is usually a frame and the tank is mounted upon the frame and does not provide the sustaining member between the points of support by the wheel elements.

The principal object of this invention is to avoid the use of an intermediate framework and to provide a self-sustaining tank structure, provision being made within the tank intermediate its points of support to transfer the thrust of the load to the points at which the tank is supported.

It is further an object and feature of this invention to provide a tank of a substantially triangular shape in cross section having a curved bottom wall merging by short curves to inwardly inclined side walls and a rounded top, preferably reinforced, forming what may be termed the "backbone" of the tank. By this arrangement, I not only secure a structure with a low center of gravity of the load but also secure a less free area of the liquid at the upper surface than in the usual round tanks and thus less opportunity for surge of the liquid.

A further feature of the invention is involved in the provision of baffle members extending vertically of the horizontal axis of the tank separating the interior into comparatively small compartments and thus restricting the surge to a small area or surface.

These and other objects and various novel features of the invention are hereinafter more fully described and claimed, and one form of construction of a vehicle tank embodying my invention is shown in the accompanying drawing in which—

Figure 1:
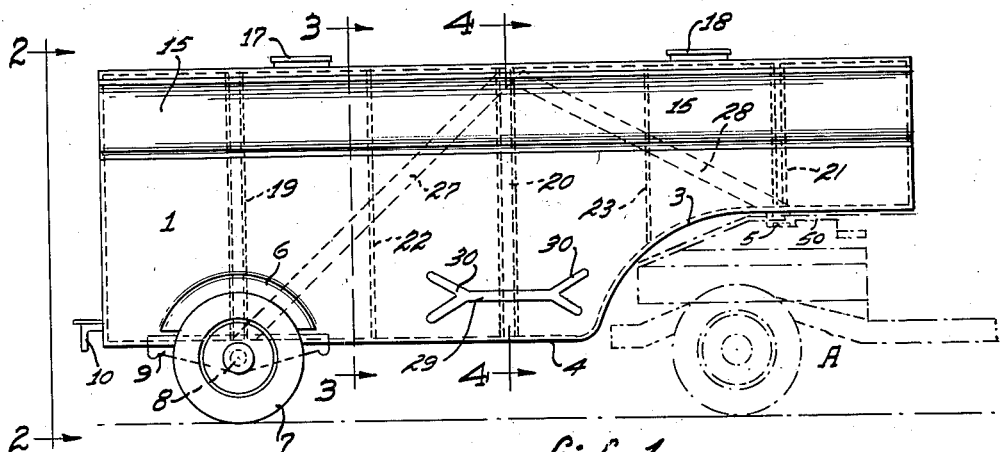
Fig. 1 is a side elevation showing my improved construction as applied to a trailer type of vehicle tank in which the forward end is adapted to be supported upon a tractor.
Figure 2:
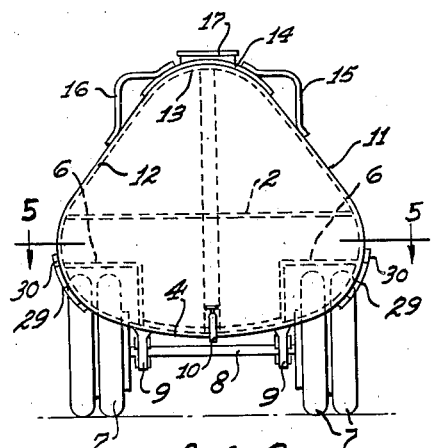
Fig. 2 is a rear elevation.
Figure 3:
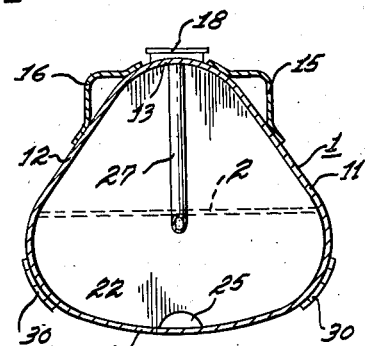
Fig. 3 is a section taken on line 3—3 of Fig. 1.

It is firstly to be observed that the invention is not confined to the specific type of trailer shown as the features of the invention may be embodied in a four-wheeled vehicle in which the forward and rear ends are each supported upon wheels individual thereto as will be readily understood by those familiar with this character of construction.

In the form shown, the forward end of the tank 1 for a distance to the rear thereof has a bottom portion 2 at about the horizontal center line of the tank proper and this wall 2 is curved as at 3 to merge with the bottom wall 4. The purpose of this offset is to permit the rear end of a tractor (indicated by dotted lines A) to be backed under the forward end of the tank and as is well known in such tractor constructions, an element 50 is provided which is engaged by the projecting headed draft pin 5, the two parts cooperating in the releasable attachment of the tractor and trailer. Toward the rear of the tank the body thereof is recessed on opposite sides at 6, 6 within which the wheels 7 of the structure are positioned, being mounted on an axle 8 supported at the bottom of the tank and on opposite sides of a center line thereof by reinforcing elements 9, 9. The tank bottom 4 is formed on a comparatively long radius not only to provide strength by reason of its form but to also provide a bottom element wherein the liquid all tends to flow to the center and eventually to a valved outlet 10 in the rear wall of the tank. This curved bottom member at its opposite sides is upturned by comparatively short curves to merge with the oppositely disposed side walls 11 and 12 which are inwardly inclined and connected by a curve 13 at the top providing the "backbone" of the tank.

By this form of the tank in cross section, the center of gravity of the liquid body is materially lower than in the usual round tanks and the thrust of the weight between the supported points of the tank is taken directly by the upper edge termed the "backbone" which may be reinforced as by means of a plate 14 riveted or welded to the outer surface of the tank. An additional sustaining means may be provided if desired by means of the angular plates 15 and 16 on opposite sides of the tank at the top, the lower longitudinal edges of which are welded or riveted to the respective opposite sides of the main body of the tank and, if convenient, to the reinforcing element 14 or to the tank proper if the reinforced element is not of sufficient width. These members 14 and 15 provide a runway for the operator extending longitudinally of the top of the tank as may be required in the filling of the tank or inspection of the interior or the contents thereof through the manholes 17 and 18. While two manholes are shown, a greater or less number may be employed if desired.

Figure 5:
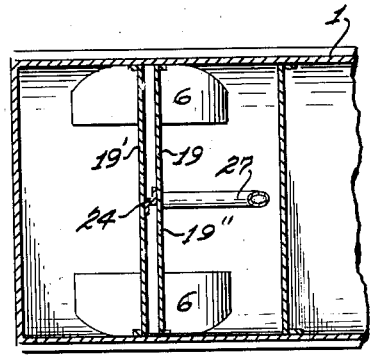
Fig. 5 is a horizontal section taken on line 5—5 of Fig. 2.

The interior of the tank is divided into sections by means of baffle plates 19, 20 and 21 and the intervening baffle plates 22 and 23. The plates 19 and 20 are preferably dual in character as will be understood from Fig. 5, the baffle 19 being formed of two like plates 19' and 19" and centrally and vertically between which is a brace bar preferably of Z form indicated at 24 having the flanges thereof welded or otherwise secured to the two plates. This prevents bulging of these plates through the weight of the liquid or tendency thereof to surge during transportation.

Figure 4:
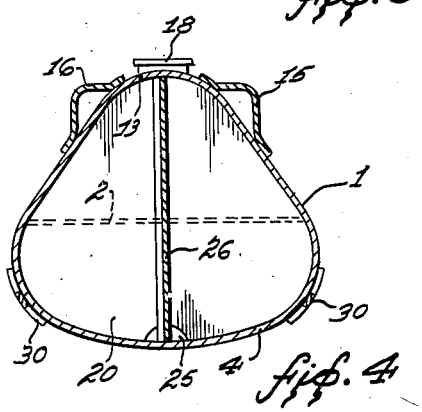
Fig. 4 is a vertical section taken on line 4—4 of Fig. 1.

The baffle member 20 is similar to the construction described relative to the baffle 19 and while the baffle 21 is of similar character it differs in that the shank of the projecting pin 5 is interposed between and secured to the two elements forming the baffle 21. The baffle plates 22 and 23 are here shown as being of a single plate and these baffles divide the interior of the tank into comparatively small compartments, the purpose being to reduce the possibility of surge of the liquid during transportation. Each of these baffle members is provided with an aperture 25 at the center of the bottom. This may be comparatively small in size to permit liquid to flow from the compartments to the outlet 10 and need not be materially greater than the cross sectional area of the outlet. It is noted in Fig. 4 that between the plates forming the baffle 20 is the vertical sustaining bar 26 of Z form in cross section corresponding to the bar 24 between the plates forming baffle 19, and further that each of the plates forming the baffles may have a peripheral flange for attaching the same to the rim face of the tank walls. The baffle 21 is formed of two closely spaced plates preferably provided with a vertical bar of the character of the vertical bar 24 or 26 respectively between the plates forming the baffles 19 and 20.

For the purpose of increasing the resistance of the tank to deformation centrally between its points of support by reason of the load carried, I preferably provide two brace bars 27 and 28, the bar 27 terminating at the center of the bottom of the vehicle directly to the bottom of the baffle 20 and at a point at the base of the vertical member 24 extending between the plates 19' and 19".

At the top the member 27 likewise is secured to the top wall and at the upper central point of the baffle 20 the inclined brace 28 extends from the top of the tank opposite the point at which the element 27 is secured and extends forwardly and downwardly toward the front end of the tank and is secured thereto at the baffle 21 and just over the king pin 5 which provides the point of support of the load at the forward end. Thus these braces run from a point at the top of the tank in a plane centrally between the points of support and extend downwardly and oppositely inclined to the points directly over the wheel elements. This construction would be the same in either a four-wheeled vehicle (not shown) or the type of trailer vehicle shown in Fig. 1. As a further means of strengthening the tank at a vertical center plane between the points of support, I provide, on opposite sides of the tank and on the short curved portions thereof where the angular side walls merge with the arcuate bottom wall, a reinforcing member 29 which may be of any desired form preferably of plate like form having the diverging end portions 30. These reinforcing elements may or may not be utilized as the necessity of use of such elements is lessened in the smaller sized tanks and increased in the larger sized tanks for greater loads and wherein there is a greater distance between the points of support of the tank.

While the brace bars between baffle plates 19 and 19" have been shown as of Z form and the inclined brace members 27 and 28 are shown as tubular bars, the invention is not confined to the specific form of brace member, other forms being utilizable without departing from the spirit and scope of the invention as set forth in the appended claims.

It is believed evident from the foregoing that the construction provides a vehicle tank wherein the customary chassis is eliminated and that the shell of the tank acts as the chassis as well as serving as a container for liquid that by the form in cross section I have been able to provide a vehicle tank of a much lower center of gravity of load than round tanks heretofore employed, and that the various objects and features of the invention are attained by the construction described.

Having thus briefly described my invention, its structure and utility, what I claim and desire to secure by Letters Patent of the United States is—

1. In a vehicle tank, a hollow body of substantially triangular form in cross section having a base of arcuate form and inwardly inclined sides united at the apex by an arcuate portion, means near the forward end and means near the rear end providing spaced supporting members for the tank, a vertical baffle element over each of said points of support and a centrally disposed baffle element, said baffle elements separating the tank into compartments and each comprising a pair of closely spaced plates extending transversely of the tank, a brace bar positioned vertically between each pair of plates supporting the same from deflection, a brace member within the tank extending from the bottom of the rear baffle member forwardly to the top of the central member, and a brace member extending from the bottom of the forward baffle rearwardly to the top of the central baffle member, said baffles having openings at the bottom permitting a flow of liquid from one compartment to another and being otherwise imperforate.

2. In a vehicle tank, a hollow body of substantially triangular form in cross section having a base of arcuate form and inwardly inclined sides united at the apex by an arcuate portion, a supporting means for the tank near the rear end and a similar supporting means near the forward end, a baffle member extending transversely of the tank above the rear point of support and a similar transverse baffle member above the rear point of the support and a central transverse baffle member therebetween, the said baffle members each being formed of closely spaced plates, an internal bracing between the plates of each baffle, intermediate baffle members consisting of a single plate extending transversely of the tank between the central baffle and the forward and the rear baffle member, a brace member extending from the bottom of the rear baffle forwardly to the top of the central baffle and through the rear intermediate baffle, and a brace member extending from the forward baffle rearwardly to the top of the central baffle through the forward intermediate baffle, said baffle elements separating the tank into compartments, each of the baffles having openings at the bottom permitting flow of liquid from one compartment to another and being otherwise imperforate.

CHARLES E. MORLEY.